INVENTORS
PETER C. KOHL
THOMAS F. BOMBERO
BY
Curtis, Morris and Safford
ATTORNEYS

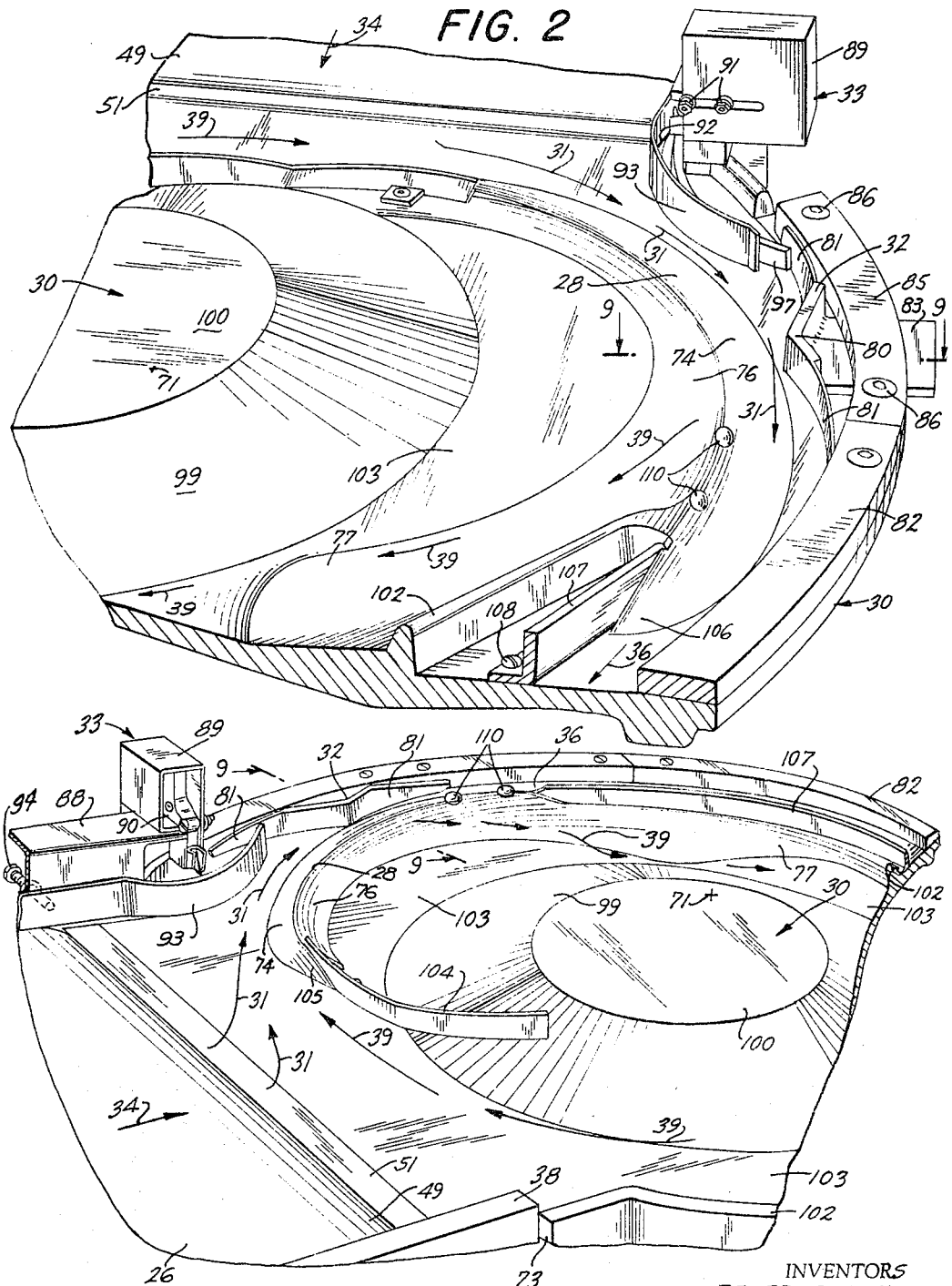

Nov. 1, 1966 P. C. KOHL ET AL 3,282,464
HIGH-SPEED AUTOMATIC ORIENTATION, ALIGNMENT AND SUPPLY
MACHINERY FOR CONFECTIONARY ARTICLES
Filed April 29, 1963 7 Sheets-Sheet 3

INVENTORS
PETER C. KOHL
THOMAS F. BOMBERO
BY
Curtis, Morris and Safford
ATTORNEYS

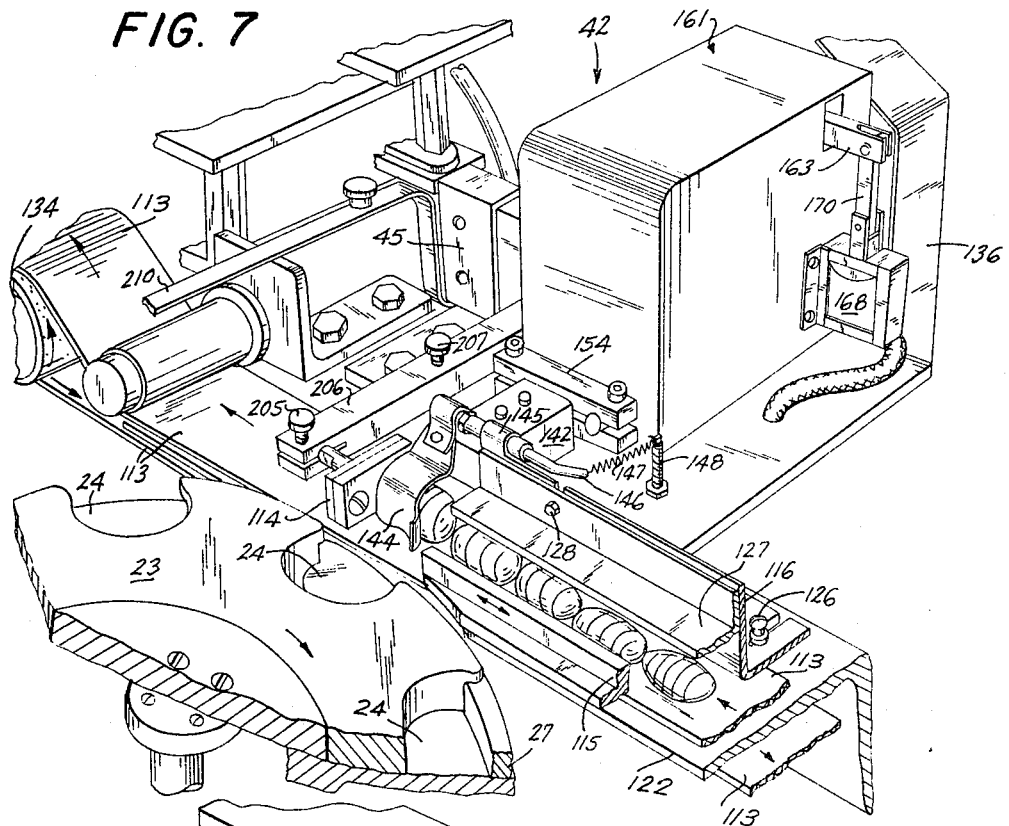
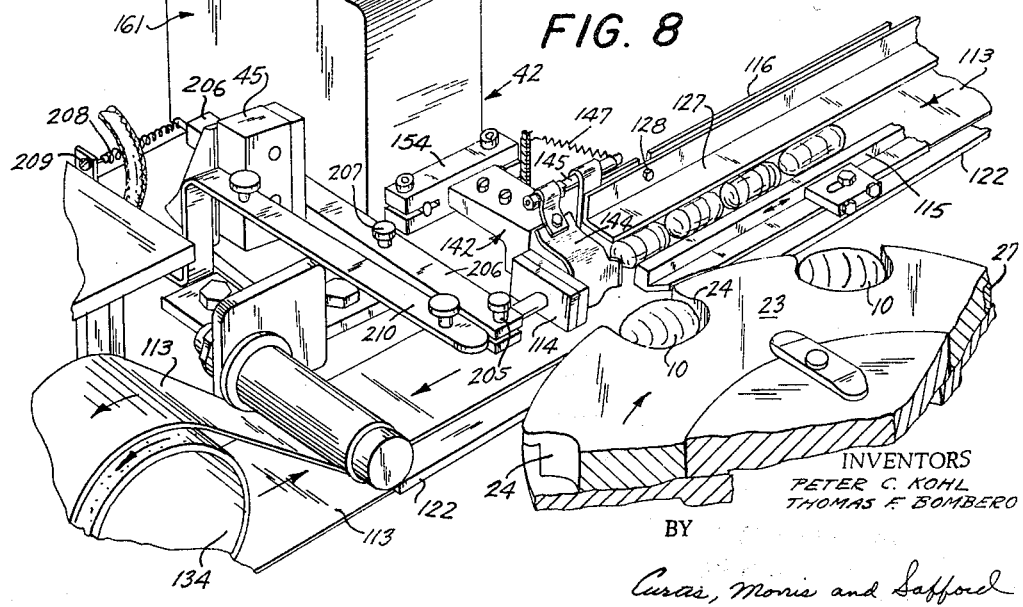

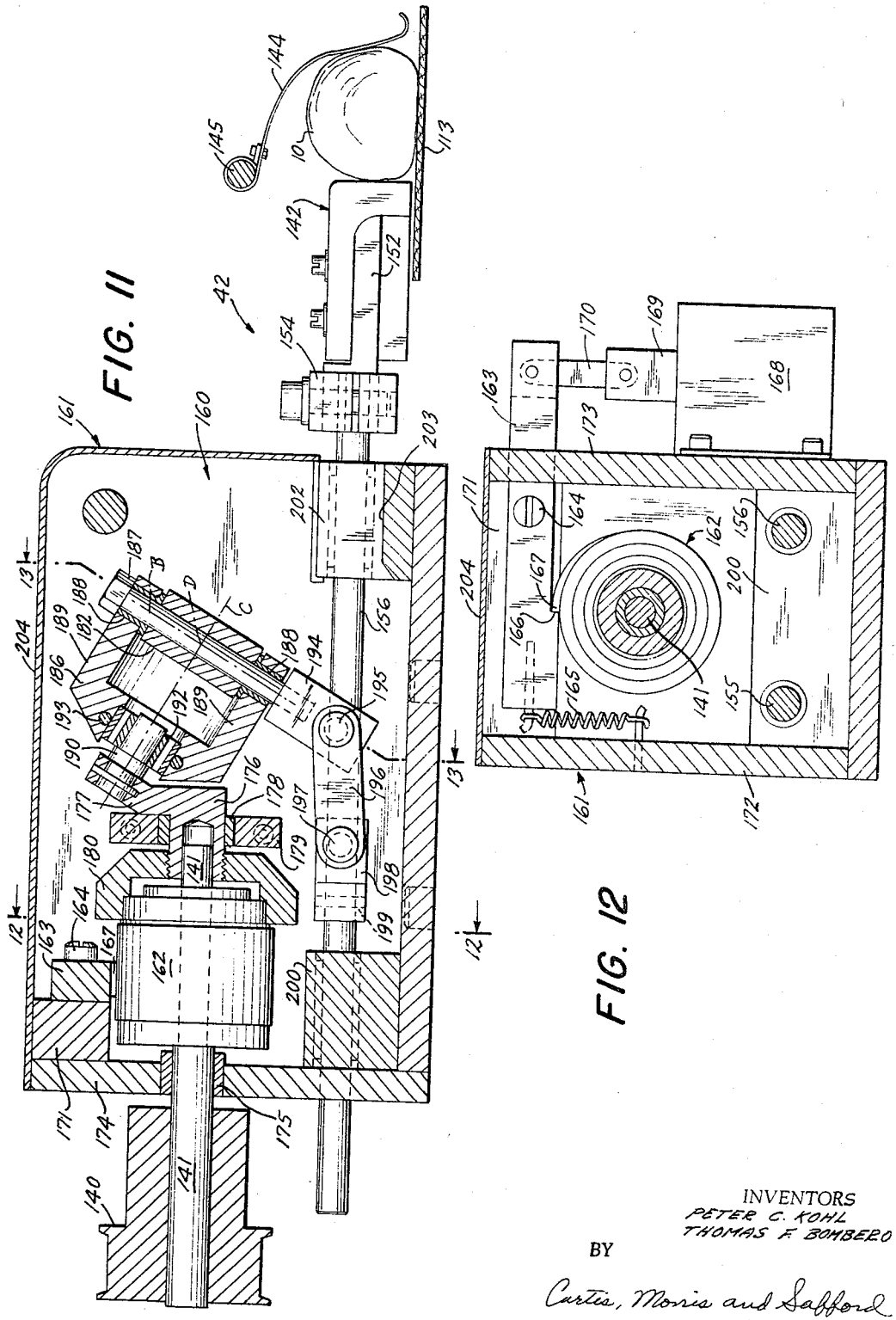

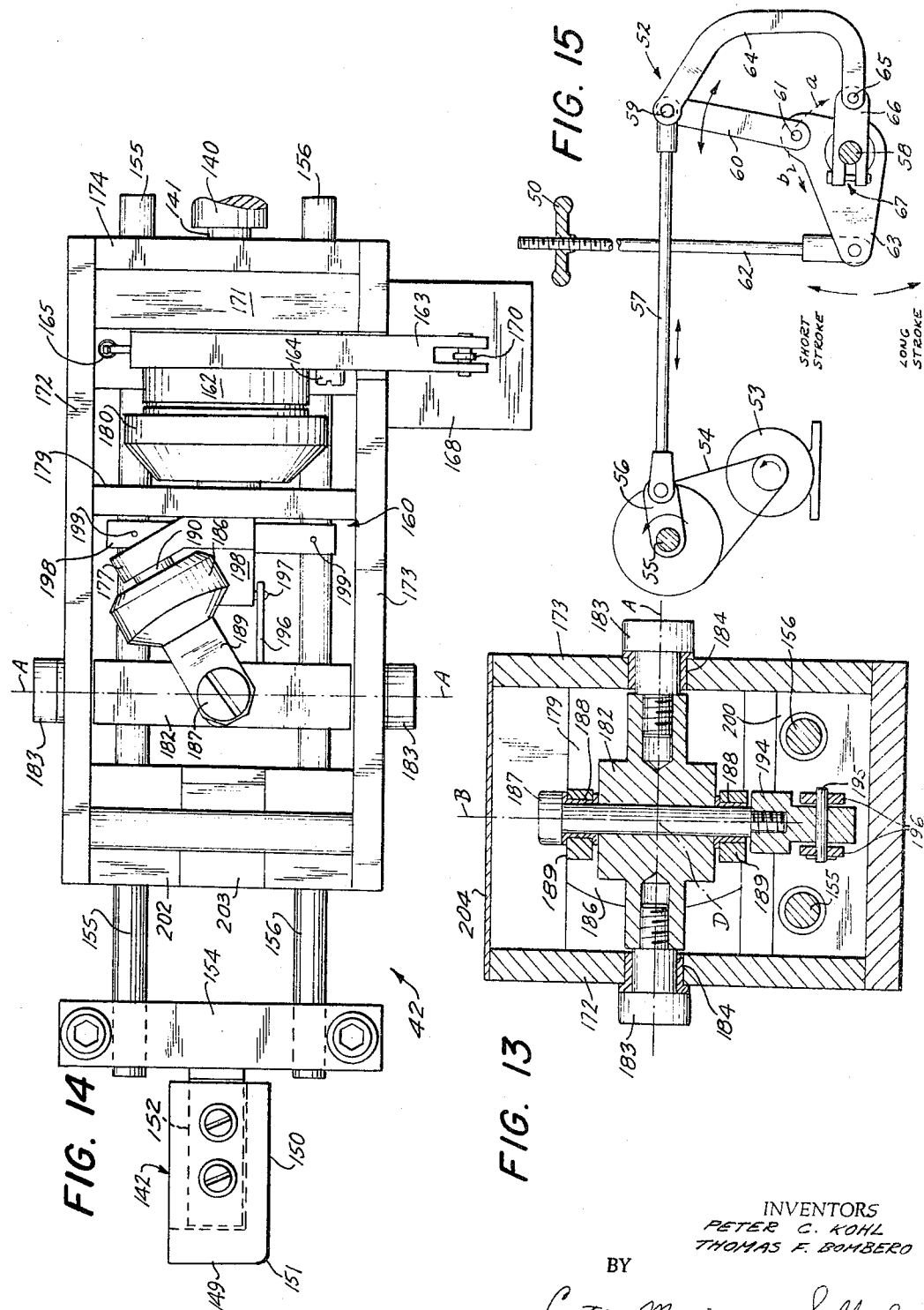

United States Patent Office 3,282,464
Patented Nov. 1, 1966

3,282,464
HIGH-SPEED AUTOMATIC ORIENTATION, ALIGNMENT AND SUPPLY MACHINERY FOR CONFECTIONARY ARTICLES
Peter C. Kohl, Stamford, and Thomas F. Bombero, Trumbull, Conn., assignors to A. E. L. Food Machinery Division, Inc., (subsidiary of Automation Engineering Laboratory, Incorporated), Stamford, Conn.
Filed Apr. 29, 1963, Ser. No. 276,339
14 Claims. (Cl. 221—1)

This invention relates to the high-speed automatic systems for handling large masses of confectionary articles and in particular to automatic supply machinery for lining up and feeding confectionary articles into apparatus for further operations to be performed upon them. The automatic supply machinery described herein as illustrative of the invention is particularly adapted for receiving a large group or bulk of confections in random positions and groupings and for gently sorting out this large mass of the confections and for feeding them for further operations to be performed on the confections, while avoiding any damage or marring of the product being handled. The automatic supply machinery described herein is capable of handling and supplying a wide variety of different shapes and sizes of confections, and in addition is capable of handling and orienting elongated confections, for example, such as rectangular, oval, and oblong shapes so that they are each arranged in the same orientation as may be desired for subsequent processing. Advantageously, these confections are smoothly and rapidly advanced and a differentiation is made between those confections which are properly oriented and those which are not, and the latter are smoothly recirculated for subsequent differentiation. Also, a differentiation is made between a single file of confections and two or more confections abreast, and those confections in excess of a single file are caused to separate themselves from the desired line.

In the manufacture of confectionary articles as described herein, there are stages in the manufacturing sequence wherein the confections are required to be supplied at a proper rate into processing apparatus for further operations to take place on them. In the case of elongated confections they must each be arranged with the same orientation for feeding into the subsequent equipment. For example, these further operations include such treatments as individual wrapping of the confectionary articles in paper, plastic or foil wrappers, and treatments such as enclosing the confectionary articles in other confections or in attractive coating of edible material, and often these further operations include packaging of the articles for protection and delivery and final sale to customers. The confectionary articles which require orientation and feeding during their processing sequence include elongated confections of many different shapes, as discussed in detail further below, and for purposes of illustration are shown as tapered oblong confections which are more difficult to orient and feed at high speed than many other shapes of confections, as will be explained.

As used herein the term confection or confectionary article is intended to emcompass chocolates, bonbons, coconut bars, sweetmeats, candies, cordial cherries, fruit candies, cakes, nut bars, cookies, and the like.

These confectionary articles have the characteristics that they are delicate, and nominally they are all of the same size and shape, but in actual practice they may vary widely in dimensions and shape as a result of confectionary manufacturing processing, even though they are all of the same type and have been produced by identical sequences of steps. Moreover, as these delicate articles are supplied from the preceding manufacturing operation they are often in a large group or bulk. These confections are suitably delivered from the previous manufacturing step, for example as by delivery on layer cards in a storage box brought from storage, as by delivery from a cooling belt progressing out of a cooling tunnel, and similar means of delivery of large groups of confections. For the purpose of performing such further operations on them as discussed above, the individual articles in this large mass of confections must be properly arranged, aligned, oriented and individually fed into the subsequent processing apparatus.

This conversion of a large batch or mass of delicate confectionary articles into a single-file line of the confections at a proper feed rate and in proper orientation for supplying into subsequent apparatus is very difficult to accomplish rapidly and at a large output rate in actual production conditions without marring the confections. In many instances prior to the present invention such delicate confectionary articles have been manually inserted into the processing equipment. This was expensive and wasteful of human talents. The present invention enables this in-feeding of the confectionary articles to be accomplished automatically, at a fast rate, in a dependable manner for continuous running hour-after-hour while maintaining the attractive appearance of each confection, and each confection is maintained right side up so that the engagement with equipment is confined mainly to the bottom surface of the confections.

Among the many advantages of the present invention are those resulting from the fact that it enables the automatic conversion at high speed of a large bulk or batch of confectionary articles into a supply bank with each article arranged in the same orientation in the bank and being fed along in the bank without jamming and enables this to be done rapidly and dependably without marring, disfiguring or crushing the delicate articles while maintaining them right side up. Moreover, the automatic machinery described herein as illustrative of the present invention is capable of handling a variety of different shapes and sizes of confectionary articles and is capable of rapidly arranging different shapes such as the tapered oblong chocolates described herein as illustrative of the capabilities of the present invention.

In this specification and in the accompanying drawings are described and shown illustrative embodiments of the high-speed automatic confectionary orientation, alignment and supply machinery of this invention, and various modifications thereof are indicated, but it is to be understood that these are not to be construed as exhaustive nor limiting of the invention, but on the contrary are given for purposes of illustration in order that others skilled in the art may fully understand the invention and the many ways of applying this invention in practical use.

The various objects, aspects, and advantages of the present invention will be in part pointed out and in part will be understood from a consideration of the following specification in conjunction with the accompanying drawings, in which:

FIGURE 1 is a perspective view of an automatic system for supplying confectionary articles at a controlled high feed rate in alignment and oriented into a supply bank for further processing. In this illustrative embodiment of the invention the confections being handled are tapered oblong chocolate candies which are being supplied into a foil wrapping machine wherein the chocolates are wrapped with a colored metallic foil. However, it will be appreciated that equipment embodying the present invention is very flexible in its operation and is well adapted for supplying confections to processing apparatus for many different types of processing as discussed above.

FIGURE 2 is a perspective view on enlarged scale of a portion of the automatic input feeding machinery shown in FIGURE 1 and looking in the direction generally opposite to the flow of the confections and wherein the bulk of confections is guided into a single line properly oriented;

FIGURE 3 is a perspective view of the same portion of the machinery shown in FIGURE 2, but looking generally in the opposite direction from FIGURE 2;

FIGURE 7 is a perspective view showing the outlet end of the supply bank adjacent to the indexing dial of a known type of foil wrapping machine;

FIGURE 8 is a perspective view corresponding with FIGURE 7 and looking from a different direction;

FIGURE 11 is an axial sectional elevational view of the bank outlet transfer mechanism;

FIGURE 12 is a transverse sectional view of the bank outlet transfer mechanism of FIGURE 11 taken along the line 12—12 of FIGURE 11;

FIGURE 13 is a transverse sectional view taken along the line 13—13 of FIGURE 11 but with the drive shaft turned 90° from its position in FIGURES 11 and 12;

FIGURE 14 is a top plan view of the transfer apparatus in the same position as in FIGURE 13; and FIGURE 15 is a schematic elevational view of the controllable hitch-feed mechanism for the feed belt 26.

GENERAL DESCRIPTION AND OPERATION

Figure 1:
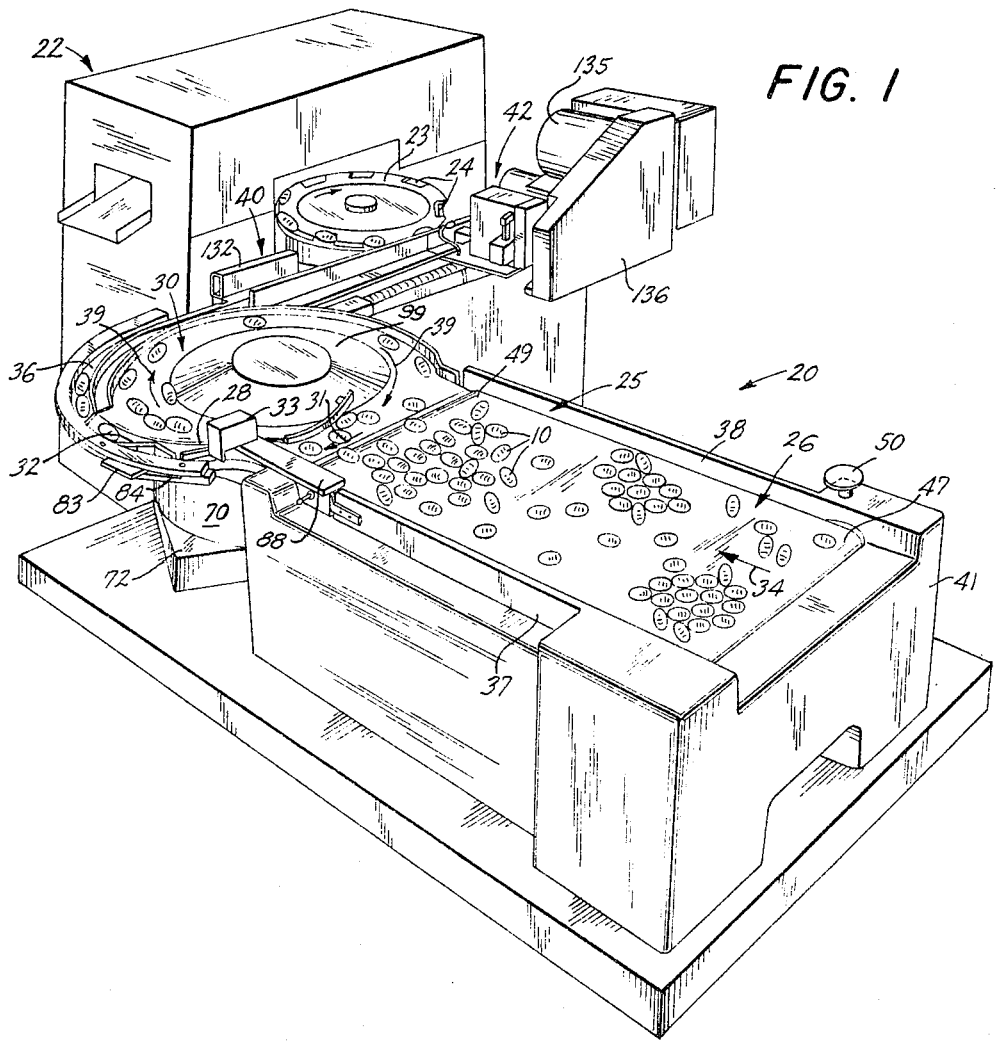

In the confectionary processing system 20 shown in FIGURE 1 as an illustrative application embodying the present invention, the confections 10 are in the form of elongated tapered oblong chocolate candies which are being supplied into processing apparatus 22. In this illustrative application the processing apparatus 22 is a foil wrapping machine of the customary dial in-feed type and including an in-feed dial 23 having a plurality of receptacles 24 spaced along the perimeter of the wheel for receiving the confections to be wrapped. In applications prior to the present invention the receptacles 24 in this type of indexing dial 23 were manually loaded, and this is accomplished automatically by machinery embodying the present invention. In the customary prior foil wrapping machines this indexing dial 23 included pockets or closed receptacles which were loaded manually in a vertical direction by placing the individual confections down into these pockets by hand. This customary indexing dial is replaced in the present system by the dial 23 having receptacles 24 which are open to the rim of the dial wheel 23 as well as being open to the top.

The confections have a known orientation and position and thus they are adapted to be transferred radially into the open receptacles 24. As soon as the indexing dial turns beyond its loading position a confining guide 27 (FIGS. 7, 8 and 10) effectively closes the radial opening into the receptacle 24 for retaining the article therein. It will be appreciated from the introductory discussion above that the confectionary processing apparatus 22 may have a wide variety of different forms for providing many different processing steps and is here shown as a foil wrapping machine by way of example, and the confections may be of many different types as discussed above.

For proper operation of the apparatus 22 the confections 10 must each be fed thereto in the same relative orientation. For example, the receptacles 24 have their major length extending along the perimeter of the dial 23 and are designed to receive the elongated confections with their length extending in a direction perpendicularly relative to the respective radii of the wheel 23. It will be understood that in various systems the orientation of the radially loaded receptacles 24 may be different from what is shown herein. These receptacles may be arranged to receive the confections with their length extending at other relationships with respect to the radii of the dial extending thereto, for example, these may be parallel to the radii or at an angle thereto.

During the handling of the confections 10 they are suitably delivered in a large group 25 (FIG. 1) including numerous individual delicate confections, often one hundred or more in each group, randomly oriented; for example, these confections may be delivered on layer cards carried in a storage box, and, in some installations these confections are delivered by raking them off from a cooling belt progressing out of a cooling tunnel, and the like, being delivered right side up but randomly arranged and positioned. In the operation of this system 20 these large groups 25 of the confections 10 are received on a wide controlled feed belt 26 and they are automatically oriented and arranged into a controlled supply bank 40 for subsequent automatic transfer into the apparatus 22. This sorting out and arranging of the individual confections is carried out dependably and at a rapid delivery rate without disturbing or damaging their freshly made appearance.

The rotary vibratory platform 30 rapidly orients and aligns the confections so as to feed them out along the path 31 through an output channel 36 to the controlled supply bank 40. Those few confections which do not become properly oriented are propagated on the platform along the recirculation path 39 as shown in FIGURE 10 so as to merge again with the incoming confections arriving from the supply belt 26. In this illustrative example of the invention which is shown in the drawings, the operator manually loads the wide controlled feed belt 26 from a tray or layer card of confectionary articles by sliding the large groups 25 of the articles off from the tray or card onto the belt 26, and then the articles move from the conveyor 26 onto the rotary vibratory platform 30. In this illustrative system the belt 26 is moved intermittently, i.e. it advances step-by-step in hitches for supplying the articles onto the platform 30. However, it will be understood that any suitable delivery arrangement can be utilized as indicated above.

Figure 10:
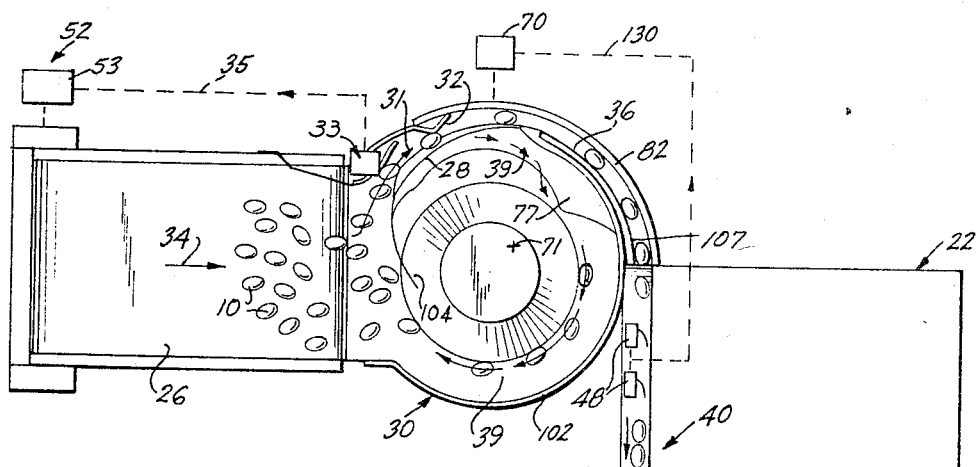
FIGURE 10 is a plan view in schematic presentation illustrating the circulation path of the confections on the vibratory platform with respect to the differentiating ridge and deflector member and showing the control operation of the system.

It is to be noted that the confections in the batch 25 on the belt conveyor 26 are right side up, but they are randomly positioned and oriented. Consequently, there are statistical variations in the numbers of confections which are transferred by the feed belt 26 onto the vibratory platform 30. The belt 26 intermittently moves in the direction 34 and holds a reserve supply of confections. This belt 26 stores the confections and transfers them on demand to the vibratory platform and the action of the rotary vibratory platform 30 is to orient the confections and to deliver them in this oriented fashion to the supply bank 40. Flood control apparatus 33 (FIGS. 1–4 and 10) adjacent to the region of transfer of confections from the belt 26 to the vibratory platform 30 advantageously regulates the feeding action of the belt 26. By means of the control connection 35, as shown in FIGURE 10 this flood control apparatus 33 temporarily stops the intermittent movement of the belt 26 whenever there is an adequate supply of confections on the vibratory platform 30 in front of the orientation and differentiation ridge 28 and deflector 32. In this manner the control apparatus 33 advantageously matches the in-feed of the confections to the system with the requirements of the system.

Figure 9:
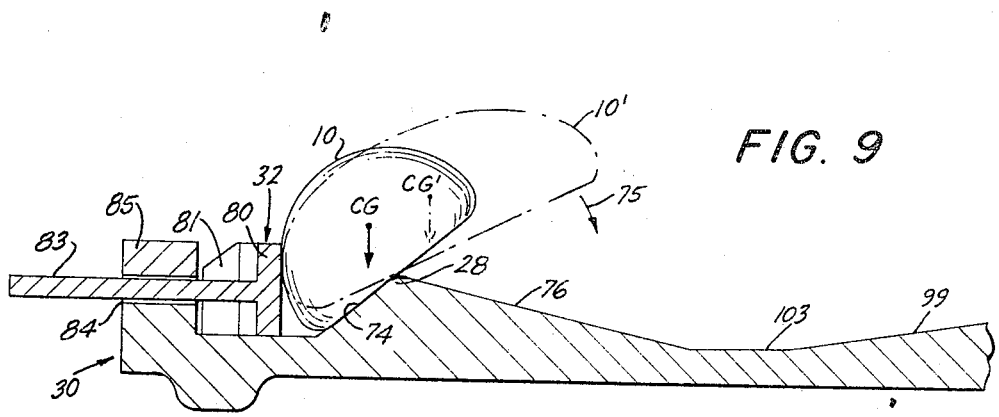
FIGURE 9 is a partial cross sectional view taken along the line 9—9 of FIGURES 2 and 3.

As the confections propagate in the direction 31, the deflector 32 and differentiating ridge member 28 cooperate to urge all confections toward proper orientation, and those confections which have the desired orientation are transferred along the output channel 36 into the supply bank 40 in readiness for automatic transfer into the foil wrapping apparatus 22. Those confections which do not happen to move into proper orientation tip over the differentating ridge member, as shown in FIGURE 9. They enter the recirculation path 39. Thus, there is an advantageous forward movement of all confections so as to maximize the output rate. There is nothing which blocks or holds up the flow, only a gently diverting of misaligned confections.

Advantageously, the vibratory platform 30 operates in the system so as to provide six functions. It (1) orients the confections, (2) differentiates between properly and improperly oriented confections, (3) transfers properly oriented confections into the supply bank 40, (4) recirculates improperly oriented confections so as to merge them again with the incoming stream of confections (5) matches the rate of feed of confections into the supply bank 40 with the demand required by said bank, and (6) controls the rate of delivery from the supply belt onto the vibratory platform itself.

In the supply bank 40 (FIGURE 10) the confections are temporarily stored ready to be transferred into the indexing dial 23 by a transfer apparatus 42. The supply bank 40 serves the function of bringing the oriented confections close together in a line in readiness for operation of the transfer mechanism 42 which pushes the confections into the respective receptacles 24. The supply bank also serves the function of equalizing the statistical variations of the feed rate of confections from the vibratory platform into the supply bank. There is a first transfer control means, for example a normally open switch 43 which is connected by a circuit 44 with the transfer apparatus 42. The control means 43 is momentarily closed whenever a receptacle 24 moves into position adjacent to the transfer apparatus 42. Actuation of the control means 43 causes the transfer apparatus 42 to transfer a confection into the positioned receptacle 24. In the event that there is no confection in the supply bank 40 in the proper position for transfer, then second control means 45, for example an open switch, prevents the operation of the transfer apparatus 42. The control means 45 is connected by a circuit 46 with the transfer apparatus 42 for preventing its operation in the absence of a suitably positioned confection.

Moreover, the supply bank 40 includes a plurality of confection sensing means 48 which are connected with the drive of the vibratory platform 30 for greatly reducing the amplitude of its vibratory motion whenever the supply bank 40 is full. Thus, advantageously there is automatically provided control information for controlling each step of the operation.

DETAILED DESCRIPTION AND OPERATION

During operation of the automatic supply machinery 20, the batches 25 of the confections are supplied from the manufacturing stage onto the belt 26, which intermittently moves the confections 10 toward the rotary vibratory platform conveyor 30, as indicated by the arrow 34. The conveyor belt 26 is formed of wide flexible material having a smooth top surface for preventing any marring of the bottom surfaces of the confections 10 resting thereon. In this illustrative embodiment of the invention the hitch-fed belt 26 is formed of fabric having a smooth outer coating of slippery plastic material.

The upper surface of the belt 26 moves between a pair of smooth parallel guide rails 37 and 38 and the belt passes in a continuous loop around a pair of parallel support rollers mounted on a housing base 41 at the opposite ends 47 and 49 of the belt 26. This belt conveyor 26 is advanced in the direction 34 at an adjustable feed rate by means of a suitable primary drive mechanism enclosed within the housing base 41, for example as described further below. A manual adjustment control wheel 50 is used for regulating the drive mechanism for adjusting the advancement movement of the belt 26 over a suitable range. As the belt 26 advances toward the vibratory platform 30 the confections 10 are transferred over onto the smooth surface of the vibratory platform 30. The vibratory platform 30 has a straight input edge 51 extending along adjacent to the end of the belt 26 where it begins to curve down over the support roller at its end 49, as seen most clearly in FIGURE 3. This straight edge 51 is positioned at all points therealong just slightly below the level of the belt 26 so that the confections readily transfer over onto the edge of the vibratory platform.

In order to advance the belt 26 with adjustable intermittent strokes a suitable hitch-feed drive mechanism is located within the base housing 41; for example, FIGURE 15 shows a suitable drive mechanism 52 which is controlled by the manual adjustment handle 50. This drive mechanism 52 includes an electric motor 53 connected by a V-belt 54 for turning a shaft 55 having a crank arm 56 secured thereto for reciprocating a connecting rod 57. A belt drive shaft 58 is connected through a ratchet, for example such as an over-running clutch and by a chain and sprocket drive with a belt-drive roller at the end 47 of the feed belt 26. Whenever the drive shaft 58 turns in a counter clockwise direction as seen in FIGURE 15 it serves to advance the belt 26, and wherever the drive shaft 58 is stationary or turning clockwise, then the belt 26 remains stationary. The over-running clutch enables the belt 26 to be pushed forward by hand if desired for feeding an intial supply when first loaded.

The connecting rod 57 is pivotally connected at 59 to a swing link 60 which is swingably mounted upon an adjustable swing center pivot 61. Adjustment of the hand wheel 50 serves to raise or lower a screw rod 62 so as to change the position of a bell crank lever 63 which is movably mounted concentric with the shaft 58. The swing center pivot 61 is secured to the opposite arm of the lever 63 from the adjustment rod 62. When the adjustment rod is raised, it moves the swing center pivot 61 to the right in a clockwise direction "a" about the drive shaft 58, and this serves progressively to reduce the advancement stroke of the belt 26 to zero, as will be explained further below. When the adjustment rod is lowered, the swing center pivot 61 is moved to the left "b," and the advancement stroke of the belt 26 is progressively increased. Thus, there is a continuous adjustment over the length of stroke of the belt 26, for example from zero up to approximately two inches. This hitch feed operates at a suitable repetition rate, for example forty strokes per minute.

A connecting link 64 couples the pivot 59 to a pivot 65 at the end of a crank arm 66 which is clamped rigidly onto the shaft 58. This connecting link 64 serves to turn the drive shaft 58 by moving the crank arm. When the swing center pivot 61 is in the direction "a" the net resultant movement of the crank arm 66 is very small, but when the swing center pivot 61 is in the direction "b" a large movement of the crank arm 66 is provided. The clamp 67 enables adjustment of the position of the crank 66 on the belt-drive shaft 58, and the curve in the connecting link 64 provides clearance to avoid striking the shaft 58 when the swing center pivot 61 is in an extreme position.

The rotary vibratory platform 30 is driven by an electromagnetic drive 70 (FIG. 1) so as to oscillate with small, rapid rotary reciprocating movements concentric about a vertical neutral axis 71 (FIGS. 2, 3 and 10) which is offset from the central area of the platform, as seen most clearly in FIGURE 10. The vibratory platform conveyor 30 has a generally circular configuration with a tangential outlet channel 36 extending from the perimeter of the platform 30 on the opposite side from the input edge 51. As the platform conveyor oscillates about the axis 71, the incoming stream of confections thereon are urged to circulate rapidly along a generally circular clockwise path 31 which is generally concentric with the axis 71.

The oscillatory movement of the platform 30 combines vertical and horizontal components of motion. During the advancing rotary movements, i.e., clockwise movement in this example as seen in plan view in FIGURE 10, the platform moves upwardly, i.e., is rapidly elevated, by a slight amount. Consequently, the confections are firmly engaged by the smooth surface of the platform and are urged to move with it. Thus, the confections are all advanced an incremental amount in the clockwise direction 31. During the returning, i.e., retrograde, counterclockwise movement of the platform 30 it is quickly lowered by a corresponding slight amount, thus reducing the frictional force between the confections and the platform so that they retain a large proportion of their incremental advancement while the platform completes its return stroke.

In order to produce this combined vertical and rotary movement, the platform 30 is resiliently mounted and suitably driven by an electromagnet 70. For example, the platform is supported by a plurality of leaf springs each canted at the same acute angle to the vertical and offset from the neutral axis 71 and positioned thereabout so that deflection of the springs causes the platform 30 to turn slightly as it is moved vertically. The electromagnet 70 rests upon a base 72 and cyclically attracts a ferromagnetic plate which is attached to the underside of the platform 30 so as to produce the desired deflection of the springs.

For example, this platform has been found to operate extremely well when the electromagnet is energized by means of unfiltered, half-wave-rectified alternating current of a frequency of 50 to 60 cycles per second, thus producing 50 to 60 rotary strokes, i.e., incremental advancing movements per second. In this example the platform 30 is formed of aluminum and its upper surface is smoothly polished. To accommodate this rotary vibratory movement of the platform 30, there are clearance gaps 73, as seen most clearly in FIGURE 3.

This oscillatory motion of the platform 30 propagates the confections along generally circular paths over the surface of the platform. There is a differentiating ridge member 28 on the platform which extends generally in an arc concentric about the axis 71. The input path 31 progresses outside of the ridge 28 and inside of the flood sensing control means 33, as seen most clearly in FIGURE 3.

As the incoming confections move along the path 31, the outer sloping surface 74 of the ridge 28 urges the elongated confections to orient themselves with their long axis extending in the direction of movement. Just beyond the flood sensing control means 33 is located an adjustable deflector cam 32 (please see also FIGURE 9) which urges the confections up the outer sloping surface 74 of the ridge 28. This deflector cam serves further to urge the confections into a position with their long axis extending in the direction of propagation. The major portion of the confections do become properly oriented and continue moving along the path 31 past the deflector cam 32 and into an output channel 36 leading to the supply bank 40.

The cooperative action of the deflector cam 32 and the ridge 28 differentiates between those confections 10 (FIGURE 9) which have the proper orientation so that their center of gravity c.g. is outside of a vertical line passing through the ridge 28 and those confections 10' which are generally transverse to the desired direction so that their center of gravity c.g.' is beyond the ridge 28. Thus, as indicated by the arrow 75 these latter confections gently tip over onto the inner sloping surface 76 of the ridge 28. Consequently, these mis-oriented confections slide down this inner surface 76 so as to enter a recirculation path 39 extending around the neutral axis 71. This inner surface 76 has a broad sloping shoulder 77 which urges these confections into the recirculation path 39.

In order to provide for different widths and contours of confections, the deflector cam 32 is adjustable, as shown in FIGURES 2 and 9. It has a rigid control portion 80 which defines the tip of the cam and a pair of streamlined resilient wing extensions 81 which are flexed and lay back smoothly against the outer wall 82 of the platform 30 so that there are no abrupt surfaces to impede the progress of the confections past this cam. The deflector has a mounting support 83 in the form of a flat lateral web extending out through a slot 84 in the outer wall, and releasable clamp means hold this support to secure the cam 32 in place. For example, as shown this releasable clamp means includes a clamp bar 85 forming the top of the wall 82 and a pair of clamp screws 86. The slot 84 is longer than the width of the cam support 83, consequently the cam can be moved toward and away from the ridge 28 as well as being moved forward and backward along the path 31 as well as being canted at different angles as may be desired for handling various sizes and shapes of confections.

In order to regulate the feeding of the confections from the belt 26 onto the vibratory platform 30, the flood control sensing means 33 is provided, as shown in FIGURES 1-4 and 10, and is effectively located on the vibratory platform closely adjacent to and on the downstream side of the region 51 along which the confections are transferred onto the platform. This sensing means 33 is mounted upon a stationary support so that the control means are isolated from the vibratory movement of the platform 30. For example, a mounting bracket 88 is secured to the guide rail 37 and extends in cantilevered relationship over the platform 30. A housing 89 on the end of this support 88 contains a sensitive switch 90 which is adjustably positioned therein as by mounting screws 91 (FIG. 2). The switch 90 has an actuating arm 92 in the form of a stiff wire which extends down adjacent to a confection sensing element 93 shown as a flexible leaf spring.

When there is an ample supply of confections recently delivered onto the platform 30 ready for engagement with the ridge 28 and cam 32, this mass of confections commences to move along the path 31 and press up against the leaf spring 93 causing it to deflect into engagement with the switch arm 92 to open the switch 90. The switch 90 is normally closed, and is connected in circuit 35 with the electric motor 53 (FIGURE 15) of the hitch feed 52 for deenergizing this motor so long as the leaf spring 93 is deflected. After the mass of confections has moved along so as to reduce pressure against the sensing element 93, it springs out away from the switch arm 92 to reenergize the belt feed.

Figure 4:
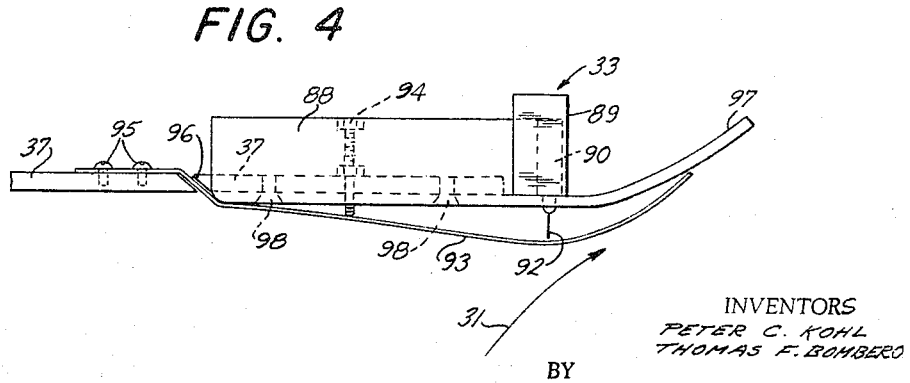
FIGURE 4 is a plan view of an adjustable automatic sensing and control means.

For adjusting the sensitivity of the control means 33, there is an adjusting screw 94 (FIGS. 3 and 4) and lock nut which presses out against a medial portion of the spring 93. By moving the leaf spring 93 further away from the switch arm 92, the system is adjusted for accommodating delivery of larger masses of confections onto the platform. To protect the confections from any sharp edges, the end of the leaf spring 93 is attached to the outer surface of guide rail 37 by fastening means 95 and passes through a diagonal notch 96 into the inside of the guide rail 37. To support the leaf spring 93 against excessive deflection and thus avoid damage to the switch arm 92, there is a curved back stop 97 provided by the vertical leg of the bracket 88. As shown in FIGURES 3 and 4 this bracket 88 has a vertical leg which is attached by screws 98 to the inner face of the guide rail 37 behind the leaf spring 93, and the end of this leg forms a curving back stop 97 for the curving end portion of the spring 93.

In order to guide the confections in the recirculation path 39, the center portion of the platform has an elevated truncated conical guide surface 99 with a horizontal central area 100. A second outer wall 102 forms a continuation of the ridge 28 and extends on past the sloping shoulder 77 and around the outside of the platform 30 and terminates at a gap 73 near the guide rail 38. Surrounding the conical surface 99 is a horizontal channel 103 along which extends the recirculation path 39.

As shown most clearly in FIGURE 3, when the confections have completed their circuit on the recirculation path 39 they encounter an outwardly directed guide wall 104 which merges into the streamlined input end 105 of the ridge 28. Consequently, those confections which have been recirculated merge smoothly with the incoming stream 34–31 of confections.

As seen in FIGURE 2 the output end of the outer sloping surface 74 of the ridge 28 slopes down at 106 into the output channel 36. This output channel 36 is defined between the outer wall 82 and a movable guide wall 107, which is adjustably secured at 108 for accommodating various sizes of confections.

Occasionally there are confections which have passed beyond the deflector cam 32 but which remain slightly turned with respect to their desired longitudinal orientation. This occurs when two adjacent confections are propagated past the deflector cam 32 in contact with each and the second confection remains in contact with the first one so as to push and restrain it. For purposes of straightening out these confections there are a pair of rounded deflector bumps 110 on the top of the ridge 28 just before the output slope 106, thus causing such confections to progress down the slope 106 in proper arrangement.

As the longitudinally oriented confections are propagated along the output channel 36 they slide down a short ramp 112 (FIGURES 5 and 6) onto the smooth slippery surface of a moving belt 113 in the supply bank 40. The belt 113 carries the confections along until the leading one (FIGURES 7 and 8) strikes against a sensing stop 114 of the supply bank. This stop 114 is faced with a slippery plastic, and all of the other exposed surfaces including the top surface of the belt 113 are coated with such a slippery plastic, e.g. polytetrafluoroethylene. The continuous movement of the belt 113 brings the confections into end-to-end relationship as shown in FIGURE 7 in readiness for transfer into the indexing dial 23, as will be explained further below. These confections have an elongated tapered configuration including decorative bands which encircle each one. There is a tendency for the tapered ends of adjoining confections to become wedged together between the front and rear side guides 115 and 116.

Figure 5:
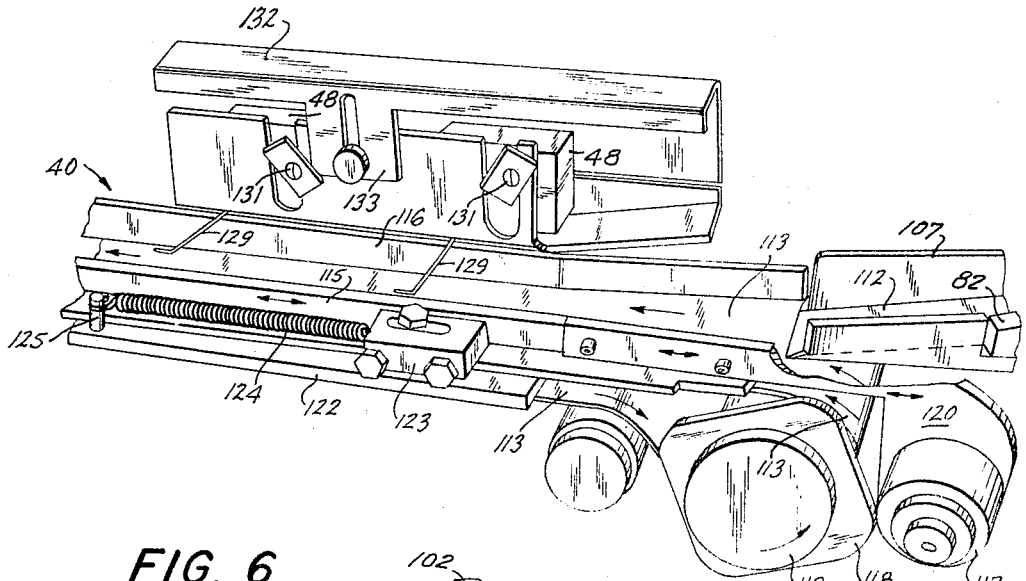
FIGURE 5 is a perspective view of the input end of a controlled supply bank for temporarily storing the properly oriented confections.
Figure 6:
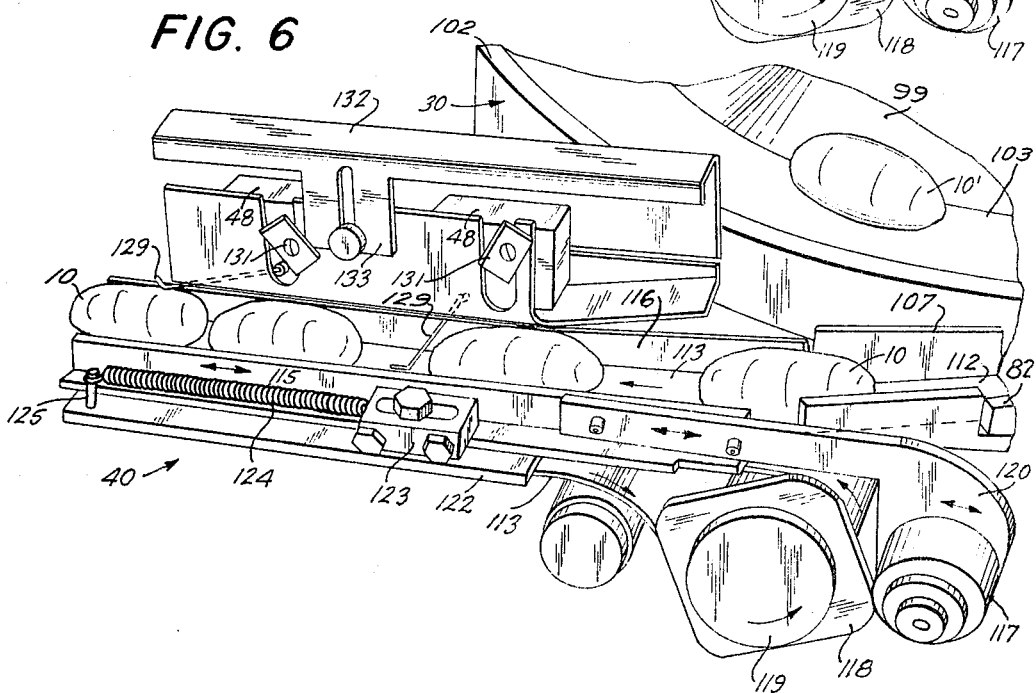
FIGURE 6 is a view similar to FIGURE 5 and illustrating the operation as the confections enter the bank.

In order to prevent this wedging action, the front guide 115 is longitudinally reciprocated as shown in FIGURES 5 and 6 by means of a roller 117 which engages the lobes of a reciprocating-drive cam 118. The cam 118 is mounted upon the tail roll 119 of the belt 113 so that it is driven by the belt at a fixed speed with respect to the belt. The roller 117 is mounted upon an L-shaped member 120 which is connected to the guide 115. This reciprocating guide 115 is supported by the frame plate 122 of the machine and is guided by a slotted slide bearing block 123. A tension spring 124 extends from the bearing block 123 to a fixed post 125 on the frame so as to keep the roller 117 in contact with the cam 118.

The rear side guide 116 is adjustably secured by suitable fastening means 126 as shown in FIGURE 7 for accommodating different widths of confections. There is a top guide 127 extending over the confections in the bank 40, and this top guide is adjustably secured to the rear guide 116 by fastening means 128 for accommodating confections of various heights.

For sensing when the supply bank 40 is full of confections there are a plurality of sensing means 48 (FIGS. 5, 6 and 10) for indicating the presence of confections in the input end of the bank 40. For example, the sensing means are shown as a plurality of normally closed switches 48 having actuating arms 129 depending into the input end of the supply bank. These switches 48 are connected in parallel as indicated in FIGURE 10 and are included in the control circuit 130 for energizing the electromagnet vibratory drive 70. When all of these arms 129 are deflected, this actuation indicates that the bank 40 is temporarily full and greatly reduces the amplitude of oscillation of the platform 30. This control action is suitably produced, for example as by including an electrical impedance in the energizing circuit for the electromagnet 70. When any one of the switches 48 is closed, this condition indicates that there is a gap as seen in FIGURE 6 in the supply, and the electrical impedance is by-passed so as to apply full voltage to the electromagnet 70. When all of the switches 48 are open, then the impedance reduces the voltage to the electromagnet drive 70 for greatly reducing the amplitude of vibration.

The reason why it is desirable to keep the vibratory drive 70 going at low amplitude is to provide sufficient feed action for actuating the flood sensing means 33 in the event that the platform 30 has just recently been amply supplied with confections at a time when the bank 40 is temporarily full, so as to stop the belt drive 52 for a suitable brief period.

The switch means 48 are adjustably mounted by fastening means 131 for accommodating various sizes of confections, and there is a switch enclosure 132 having an adjustable support 133.

The moving belt 113 is driven by a head roll 134 (FIGURES 7 and 8) having a roughened outer surface, and in FIGURE 1 is seen the motor 135 for driving this roll 134. With reference to FIGURE 1, it is noted that there is a drive belt within the housing 136 which follows a triangular path in passing around three pulleys. One of these pulleys is on the shaft of the motor 135, another is on the shaft of the belt drive roll 134, and the third pulley 140 is seen in FIGURE 11 and serves to turn the drive shaft 141 of the transfer mechanism 42.

As discussed previously, the transfer mechanism 42 serves to transfer the confections radially into the receptacles 24 in the indexing dial 23. This transfer mechanism is shown in FIGURES 7, 8 and 10–14 to which reference will be made in the following description. When a confection 10 is in the transfer position adjacent to the sensing stop, it is held snugly against a transfer pusher 142 by means of a spring biased movable cover 144. This cover 144 is mounted on a rotatable shaft 145 having an arm 146 (FIGURE 7) to which a spring 147 is attached with its other end connected to an anchor post 148. As the pusher moves forward the cover 144 is pushed up out of the way, and the confection 10 is pushed over into the positioned receptacle 24. The side face 150 (FIGURE 14) of the pusher 142 serves to restrain the next adjacent confection in the supply bank 40 while the pusher is in its extended position. As soon as the confection is seated in the receptacle 24, the pusher 142 is immediately withdrawn so as to allow the next confection to advance up against the sensing stop 114.

For protecting the confections the front face 149 (FIGURE 14) and the side face 150 of the pusher are of smooth slippery material and the leading corner 151 of the pusher is rounded. For example, the pusher member 142 is formed of rigid plastic fastened by screws upon a plunger 152 which is mounted upon a clamp bracket 154 which is clamped onto a pair of slide rods 155 and 156.

In order to operate the pusher 142 with a smooth acceleration and deceleration, a transfer drive mechanism 160 is located within a housing 161. This mechanism 160 is driven by the continuously rotating shaft 141 and is controlled so as to produce a single forward stroke and return of the pusher 142 whenever a receptacle 24 is in the transfer position, if there is a confection in readiness in the transfer position, i.e. pressing against the sensing stop 114. If there is no confection ready, then the pusher 142 does not operate. In this illustrative system the indexing dial 23 is permitted to advance periodically to its next position in its normal cycle, for example at 85 indexes per minute, even though there are rare occasions when one of the receptacles 24 may be empty. This avoids complexity in the control system by permitting the apparatus 22 to continue running at its normal speed of operation.

The mechanism 160 includes a single-revolution clutch 162 controlled by a clutch release arm 163 which is pivoted at 164 and is normally held by a spring 165 so that a stop 166 on the arm 163 engages an abutment shoulder 167 on the periphery of the clutch 162. A solenoid 168 has its armature plunger 169 connected by a link 170 with the end of the release arm 163. Whenever the solenoid is energized, the stop 166 is momentarily lifted free of the shoulder 167 so that the outer casing of the clutch 162 is allowed to make one complete revolution with the shaft 141, and then the clutch is again stopped in the position shown in FIGURE 12. The pivot 164 is mounted on a transverse brace 171 extending between the two side plates 172 and 173 of the housing 161 and adjacent to a back plate 174. The rotating drive shaft 141 extends through a bearing 175 in the back plate 174, and the front end of this shaft 141 (FIGURE 11) is freely journaled in the hub 176 of a crank arm 177. The function of this crank arm will be described further below. This hub 176 is journaled in a bearing 178 in a second transverse brace 179 of the housing.

The mechanism 161 advantageously converts the rotary motion of the shaft 141 into reciprocating motion parallel to the axis of the shaft 141. Thus, this mechanism 160 enables the motor 135 (FIGURE 1) to be used to drive the belt 113 in the bank 40 and also to drive the pusher 142 which reciprocates transversely with respect to this belt. Furthermore, the structure of the mechanism 161 is such that it enables the use of permanently lubricated bearings, and this is desirable in the handling of food products to avoid contamination with oil or grease.

A bell member 180 firmly grips the clutch casing 162 and is screwed onto the hub 176 of the crank arm 177. Consequently, this arm 177 makes one complete revolution with the clutch 162 whenever this clutch is released by the solenoid 168. To convert this rotary motion of the crank arm 177 into reciprocating movement in a direction parallel to the axis of rotation of the arm 177, a first yoke member 182, as seen most clearly in FIGURE 13 is pivotally mounted on a first axis A perpendicular to the axis of rotation of the crank arm 177. This axis A, for example, is shown as extending through the side plates 172 and 173, and the first yoke 182 is supported on a pair of shoulder screws 183 journalled in self-lubricating bearings 184 in the side plates 172 and 173. A second yoke member 186 is pivotally mounted on the first yoke member 182 on a second axis B perpendicular to the first axis A and intersecting the first axis at a common center point D. A pivot pin 187 extends through the first yoke member 182 along the axis B and carries a pair of self-lubricating bearings 188 on opposite sides of the first yoke member. The second yoke member 186 has a pair of legs 189 which straddle the first yoke member and are pivotally mounted on the bearings 188. The end of the arm 177 is bent forwardly and inwardly and is rotatably connected to the second yoke 186 along a third axis C which intersects with the axes A and B at the common center point D. A pivot pin 190 extending along axis C is mounted in the end of the arm 177 and is journaled in a bearing 192 in the enlarged central portion of the second yoke 186 between its two legs 189. To accommodate any minute variations in manufacturing tolerances and thus avoid binding, the bearing 192 is loosely fitted into the yoke 186 and is held in place by a rubber O-ring 193 so that this bearing 192 is effectively self-aligning in operation.

As the arm 177 is revolved, the axis C defines a right-circular cone having its apex at point D. The result is that the axis B swings back and forth about the point D so as to produce a generally sinusoidal acceleration and deceleration of the two slide rods 155 and 156, i.e. an advantageously smooth acceleration and deceleration of the pusher 142.

For driving the slide rods 155 and 156, the lower end of the pivot bolt 187 is screwed into a connecting element 194 which is swingably connected by a pivot 195 and a pair of parallel links 196 with a pivot 197 in the shank of a T-shaped cross head 198. This cross head 198 is rigidly fastened to the slide rods 155 and 156 as by pins 199.

To guide the two slide rods 155 and 156, a rear bearing block 200 and a front bearing block 202 are provided. Both of these bearing blocks extend across the width of the housing 161, and the front bearing block 202 has a central notch 203 to provide clearance for forward movement of the lower end of the connecting element 194 and the links 196. A removable cover 204 has been removed in FIGURE 14.

In FIGURES 11 and 12 the arm 177 and second yoke 186 are shown in their initial position with the pusher 142 fully retracted. In FIGURES 13 and 14 the arm 177 has been revolved through 90° so that the second yoke 186 is swung off to one side, and the pusher 142 has been moved to a position half way through its stroke.

As shown in FIGURE 10 a switch 43 senses the position of the index dial 23, and whenever a receptacle 24 is first swung into the transfer position, this switch 43 closes a circuit 44 for momentarily energizing the solenoid 168, thus causing the pusher 142 to make one stroke. In order to prevent movement of the pusher 142 when no confection is ready, the stop block 114 (FIGS. 7 and 8) is adjustably mounted at 205 on a lever 206 which is pivotally mounted at 207. A sensitive switch 45 senses the movement of this lever 206. For reasons which will be explained this switch 45 is normally closed but is held open by a spring 208 in the absence of any confection against the stop 114. This spring 208 is attached to the rear end of the lever 206 and is secured by a tension adjusting screw 209 to the frame. This switch 45 is connected by a circuit 46 (FIG. 10) so that it prevents actuation of the solenoid 168 in the absence of any confection against the sensing stop 114.

The reason for using a normally closed switch 45 which is held open by an adjustable spring force 208 is to provide a very sensitive action, because the force of an individual confection against the stop 114 is quite small, and nevertheless its presence must be accurately sensed. This very sensitive action is produced by this arrangement because the force of the spring 208 is adjusted for slightly overbalancing the internal spring force of the switch 45. Thus, the switch 45 is just barely held open in the absence of a confection against the stop 114, i.e. the differential between the internal switch spring and the spring 208 is very small, but spring 208 is dominant. When a confection lightly touches this stop 114 its slight force aids the internal spring force so as to overcome the slight differential in forces and the spring 45 is allowed to close itself. The position of the stop 114 on the lever 206 is adjusted at 205 when desired for accommodating different lengths of confections so that the confections are centered with respect to the plunger 142.

For wrapping various sizes of confections, the indexing dial 23 is removable and can quickly be replaced with another similar dial having receptacles 24 of different sizes or contours. For protection and sanitation a transparent plastic cover is normally mounted upon a support 210 (FIGS. 7 and 8) so as to extend over the transfer mechanism and adjacent half of the dial 23.

With reference to FIGURES 9 and 10 it is noted that the apparatus is used to advantage for handling and supplying a wide variety of shapes and sizes of confections including shapes and sizes which do not require orientation, for a differentiation is made between a single file of confections and two or more confections abreast. A single file of confections continues progressing along the slope 74, but those confections in excess of a single file are urged over the ridge 28 and are smoothly recirculated.

From the foregoing it will be appreciated that the present invention is well suited to provide the advantages set forth, and since many possible embodiments may be made of the various features of this invention and as the apparatus and system described herein may be varied in various parts, all without departing from the scope of the invention, it is to be understood that all matter hereinbefore set forth or shown in the accompanying drawings is to be interpreted as illustrative and that in certain instances some of the features of the invention may be used without a corresponding use of other features, all without departing from the scope of the invention as claimed hereinafter.

What is claimed is:

1. A system for processing confections for receiving a large mass of confections right side up and randomly positioned and oriented and for gently orienting and aligning the confections while maintaining them right side up to protect the appearance of their upper surfaces comprising a wide smooth belt for receiving the large mass of confections thereon right side up, intermittent drive means for advancing said belt with short forward strokes, a vibratory platform for receiving the confections fed by said belt and arranged for rotary vibratory reciprocation about an axis, an elongated arcuate ridge on said platform extending generally concentric with said axis, said ridge having a first slope extending outwardly and downwardly from said ridge and a second slope extending inwardly and downwardly from said ridge, rotary vibratory drive means vibrating said platform with rotary vibratory reciprocation about said axis for propagating the confections along said platform outside of said ridge, deflector means outside of said ridge and near to said first slope for guiding the confections up said slope adjacent to said ridge, outlet means from said platform beyond said deflector means for the confections which have remained on said first slope after passing said deflector means, guide means on said platform for recirculating the confections which have passed over said ridge onto said second slope around said axis and back to the initial position outside of said ridge, a continuously moving belt for receiving the confections from said outlet means, stop means for restraining the lead confection on said moving belt for forming a supply line of adjacent confections, and transfer means for feeding the confections out of said supply line.

2. In a system for processing confections, automatic supply mechanism for receiving a large mass of randomly positioned elongated confections and for orienting and arranging said confections into a line and for keeping the confections right side up comprising a vibratory platform having an area for receiving confections thereon right side up and defining a first path extending away from said area, an elongated ridge member on said platform having first and second sloping surfaces inclined downwardly on opposite sides of said ridge, said ridge extending along adjacent to a portion of said first path with said first sloping surface inclining down into said first path, said platform defining a circulation path thereon returning from said second sloping surface to said receiving area for returning to said receiving area the confections which have passed over said ridge, said second sloping surface being effectively continuous with said circulation path for guiding the confections right side up as they are returned to said receiving area, vibratory drive means for oscillating said platform with vibratory reciprocating movement for propelling the confections along said first path traversing said first sloping surface generally parallel with said ridge, deflector means on the opposite side of said first path from said ridge and converging toward said ridge for urging the confections up said first surface until the center of gravity of confections transversely oriented with respect to said first path is beyond the top of said ridge for urging the transversely oriented confections over said ridge onto said second sloping surface, whence they are returned along said recirculation path to said receiving area.

3. In a system for processing confections, automatic supply mechanism for receiving a large mass of randomly arranged and positioned elongated confections right side up and for orienting and arranging said confections into a line while maintaining said confections right side up comprising a vibratory platform, an elongated ridge member on said platform having first and second sloping surfaces inclined downwardly on opposite sides from said ridge, vibratory drive means for oscillating said platform with vibratory reciprocating movement for propelling the confections along a path traversing said first sloping surface generally parallel with said ridge, deflector means on the opposite side of said path from said ridge and converging toward said ridge for urging the confections up said first sloping surface in their right side up position until the center of gravity of confections transversely oriented with respect to said path is beyond the top of said ridge for urging the transversely oriented confections over beyond the top of said ridge onto said second sloping surface without tumbling said confections for supporting the confections right side up on said second sloping surface and the center of gravity of confections longitudinally oriented with respect to said path remains in said path, outlet means from said path for the longitudinally oriented confections, and said vibratory platform having a recirculation path extending from said second sloping surface back to the first-mentioned path, said second sloping surface inclining down to said recirculation path and being continuous with said recirculation path for returning the confections from beyond said ridge back to the initial portion of the first path in their right side up position.

4. Automatic supply mechanism for receiving a large mass of confections right side up and randomly arranged and positioned and for arranging said confections into a path single file while maintaining said confections right side up to protect the fresh appearance of their top and side surfaces comprising a wide smooth belt for receiving the large mass of confections thereon, hitch-feed mechanism for intermittently advancing said belt, a vibratory platform for receiving confections from the belt onto a first region of the platform, an elongated ridge member on said platform having a sloping surface inclined downwardly from said ridge, vibratory drive means for oscillating said platform with vibratory reciprocating movement for propelling the confections along a path from said first region traversing said sloping surface generally parallel wth said ridge, deflector means on the opposite side of said path from said ridge and converging toward said ridge for urging the confections up said sloping surface until the center of gravity of the upper one of two adjacent confections is beyond the top of said ridge for tipping the upper confection over beyond the top of said ridge and the center of gravity of single confections remains in said path, outlet means from said path for a single file of confections, and means for returning the confections from beyond said ridge back to said first region of said platform.

5. In the processing of large masses of delicate confectionary articles having an elongated shape and a bottom surface and wherein the confectionary articles are desired to be maintained right side up at all times to protect their delicate upper surfaces, the method of gently orienting each of the confections with its length extending longitudinally in a known direction and each right side up comprising the steps of initially placing the confections in their right side up position, propagating the confections in said direction along a sloping surface which is inclined generally at right angles to said direction and has a ridge extending in said direction, guiding the confections toward the ridge while continuing to propagate the confections in said direction in their right side up position with the center of gravity of longitudinally oriented confections remaining on the initial side of said ridge and with the center of gravity of the transversely oriented confections gradually commencing to move beyond said ridge, causing said transversely oriented confections to pass beyond said ridge in their right side up orientation, propagating the longitudinally oriented confections away for further processing and recirculating the confections right side up from beyond the ridge back to said sloping surface.

6. Apparatus for handling confections for receiving a large group of confections randomly positioned and for arranging them into a line comprising a generally circular rotary vibratory platform having a generally horizontal channel providing a recirculation path, a ridge member on said platform having a first sloping surface inclined downwardly and outwardly from said ridge, a second sloping surface inclined downwardly and inwardly from said ridge and continuing down into said channel, rotary vibratory drive means vibrating said platform for propelling confections along said first sloping surface, guide means converging toward said ridge member for pushing the confections up said first sloping surface right side up for moving the confections along said first sloping surface adjacent to said ridge, and outlet means for a single file of confections from said first sloping surface beyond said ridge, and said horizontal channel extending back to said first sloping surface.

7. Automatic supply mechanism for receiving a large mass of confections right side up and randomly arranged and positioned and for arranging said confections into a path single file while maintaining said confections right side up comprising a wide smooth belt for receiving the large mass of confections thereon, hitch-feed mechanism for intermittently advancing said belt, a vibratory platform for receiving confections from the belt onto a first region of the platform, control means adjacent to said first region of the vibratory platform sensing the confections on said platform for controlling the operation of said hitch-feed mechanism, an elongated rounded ridge member on said platform having a sloping surface inclined downwardly from said ridge, vibratory drive means for oscillating said platform with vibratory reciprocating movement for propelling the confections along a path from said first region traversing said sloping surface generally parallel with said ridge, deflector means on the opposite side of said path from said ridge and converging toward said ridge for guiding confections up said sloping surface adjacent to said rounded ridge, outlet means from said path for a single file of confections, and means for returning any confections which have progressed over the top of said rounded ridge beyond said ridge back to said first region of said platform.

8. Apparatus for processing confections for receiving a large mass of confections right side up and randomly positioned for gently aligning the confections while maintaining them right side up to protect the appearance of their upper surfaces comprising feed means for receiving the large mass of confections thereon right side up, drive means for said feed means for advancing the confections, a vibratory platform for receiving the confections fed by said feed means, control means near the juncture of said feed means and said vibratory platform for controlling said feed means as a function of the confections fed by said feed means, an arcuate ridge on said platform extending generally concentric with an axis, said ridge having a slope extending outwardly and downwardly from said ridge, rotary vibratory drive means vibrating said platform with rotary vibratory reciprocation about said axis for propagating the confections along said platform outside of said ridge, deflector means outside of said ridge and near to said slope for guiding the confections up said slope adjacent to said ridge, outlet means from said platform beyond said deflector means, means for recirculating the confections which have passed over said ridge back to a point near said juncture, supply means for receiving the confections from said outlet means, second control means for controlling said rotary vibratory drive means as a function of the confections in said supply means, and transfer means for feeding the confections from said supply means.

9. Apparatus as claimed in claim 8 including a third control means for controlling the operation of said transfer means as a function of processing apparatus to which the confections are being fed by the said transfer means.

10. Apparatus as claimed in claim 9 including fourth control means for controlling said transfer means as a function of the confections in said supply means.

11. Apparatus as claimed in claim 8 wherein said second control means causes said rotary vibratory drive means to operate at reduced amplitude when said supply means has been amply supplied with confections.

12. In a system for processing elongated confections, automatic supply mechanism comprising wide conveyor means for receiving the large mass of confections thereon in their right side up position, feed mechanism for said conveyor means, a vibratory platform for receiving confections from the conveyor means onto a first region of the platform in their right side up position, an elongated ridge member on said platform, vibratory drive means for oscillating said platform with vibratory reciprocating movement for propelling the confections along a path from said first region extending generally parallel with said ridge, deflector means on the opposite side of said path from said ridge and converging toward said ridge for urging the confections toward said ridge in their right side up position until the center of gravity of confections which are transversely oriented with respect to said path is beyond the top of said ridge for urging the transversely oriented confections over beyond the top of said ridge but the center of gravity of confections which are longitudinally oriented with respect to said path remains in said path, outlet means from said path for the longitudinally oriented confections, said ridge having a gently sloping surface beyond the top of said ridge for supporting the confections thereon, said confections being right side up on said gently sloping surface, said platform having a return path extending from said gently sloping surface to said first region for returning the confections in their right side up position from beyond said ridge back to said first region of said platform.

13. Automatic supply mechanism for confections comprising conveyor means for receiving a large mass of confections thereon and having a discharge end, drive mechanism for said conveyor means for moving the confections toward said discharge end, a rotationally vibrated platform adjacent to the discharge end of said conveyor means for receiving confections from the conveyor means onto a first region of the platform, control means adjacent to said first region and adjacent to the discharge end of the conveyor means for sensing the confections delivered onto said platform for controlling the operation of said drive mechanism, outlet means from said rotationally vibrated platform, supply bank means for receiving the confections from said outlet means, and sensing means for sensing the quantity of confections in said supply bank means for diminishing the amplitude of rotary vibrations of said platform when said quantity reaches a predetermined amount.

14. Apparatus for processing confections for receiving a large mass of confections right side up and randomly positioned for gently aligning the confections while maintaining them right side up to protect the appearance of their upper surfaces comprising feed means for receiving the large mass of confections thereon right side up, drive means for said feed means for advancing the confections, a rotationally vibrated platform for receiving the confections fed by said feed means, rotationally vibratory drive means for vibrating said platform with rotary vibratory reciprocation about an axis for propagating the confections along path on said platform, sensing means positioned adjacent to said path for sensing the force exerted by the confections being propagated along said path for controlling said drive means, outlet means from said platform for passing the confections one at a time, a supply bank for temporarily storing the confections received from said outlet means, and control means for controlling the amplitude of said rotationally vibratory drive means as a function of the confections in said supply bank.

References Cited by the Examiner

UNITED STATES PATENTS

| | | | |
|---|---|---|---|
| 1,673,731 | 6/1928 | Brindle | 221—1 |
| 1,702,901 | 2/1929 | Hungerford | 221—1 |
| 2,211,511 | 8/1940 | Melzer et al. | 221—13 |
| 2,337,667 | 12/1943 | Kuehlman | 221—10 |
| 2,574,771 | 11/1951 | Zimmermann et al | 221—13 |
| 2,725,971 | 12/1955 | Clark-Riede | 221—159 X |
| 2,744,612 | 5/1956 | Kay et al. | 221—156 X |
| 2,777,561 | 1/1957 | Rose | 198—33.1 |
| 2,867,313 | 1/1959 | Deshaw et al. | 198—33.1 |
| 2,914,161 | 11/1959 | Black et al. | 221—157 X |
| 3,012,344 | 12/1961 | Schott. | |
| 3,042,181 | 7/1962 | Rise | 198—33.1 |
| 3,084,780 | 4/1963 | Whitney | 221—160 X |
| 3,103,283 | 9/1963 | Preuss | 221—160 X |
| 3,127,001 | 3/1964 | Ferris | 198—33.1 |

FOREIGN PATENTS 642,423 5/1928 France.
843,864 8/1960 Great Britain.
160,758 10/1957 Sweden.

ROBERT B. REEVES, *Primary Examiner.*

KENNETH N. LEIMER, LOUIS J. DEMBO,
*Examiners.*